United States Patent
Thomas

(10) Patent No.: US 6,318,426 B1
(45) Date of Patent: Nov. 20, 2001

(54) WEATHER BLANKET

(76) Inventor: Gerald R. Thomas, 3407 Mockingbird La., Midwest City, OK (US) 73110

(*) Notice: Subject to any disclaimer, the term of this patent is extended or adjusted under 35 U.S.C. 154(b) by 0 days.

(21) Appl. No.: 09/598,359

(22) Filed: Jun. 21, 2000

Related U.S. Application Data
(60) Provisional application No. 60/140,505, filed on Jun. 22, 1999.

(51) Int. Cl.⁷ .................................................. B65D 85/00
(52) U.S. Cl. .................... 150/166; 160/370.21; 296/95.1
(58) Field of Search ..................................... 150/154, 156, 150/166; 296/136, 95.1; 160/370.21, 370.22

(56) References Cited

U.S. PATENT DOCUMENTS

| | | |
|---|---|---|
| D. 382,843 | 8/1997 | Drouin . |
| D. 402,622 | 12/1998 | Rogers . |
| 2,201,984 * | 5/1940 | Clark .................................. 150/166 |
| 3,665,355 * | 5/1972 | Sasaki et al. ..................... 296/136 X |
| 4,827,997 * | 5/1989 | Rolan ................................ 150/166 |
| 4,889,171 * | 12/1989 | Minimo ............................. 150/166 |
| 4,904,894 | 2/1990 | Henry et al. . |
| 5,242,206 | 9/1993 | Heck . |
| 5,275,460 * | 1/1994 | Kraus ................................ 296/136 |
| 5,287,904 | 2/1994 | Smith et al. . |
| 5,350,000 | 9/1994 | Wang . |
| 5,401,074 | 3/1995 | Timerman . |
| 5,518,289 | 5/1996 | Cobble . |
| 5,664,825 | 9/1997 | Henke et al. . |
| 5,800,006 * | 9/1998 | Pettigrew ........................... 150/166 |
| 5,915,399 * | 6/1999 | Yang ................................. 150/166 |
| 6,070,629 * | 6/2000 | Whiteside ........................... 150/166 |
| 6,113,142 * | 9/2000 | Tolbert ............................. 150/166 X |

OTHER PUBLICATIONS

Hailno, Inc., Printed copy of Internet Web page (2 pages) located at www.hailno.com/hailno1/home1/.

\* cited by examiner

*Primary Examiner*—Allan N. Shoap
*Assistant Examiner*—Tri M. Mai
(74) *Attorney, Agent, or Firm*—Dunlap, Codding & Rogers, P.C.

(57) ABSTRACT

The present invention provides an apparatus and associated method for protecting an object from the effects of inclement weather. In one aspect, the present invention provides an apparatus comprising a cover which has a central portion and a skirt portion. The central portion further comprises a plurality of pad members which are disposed about the central portion to allow an efficient and convenient method for folding the apparatus. The skirt portion further comprises webbing and eyelets which are used to secure the apparatus to an object in the presence of inclement weather.

12 Claims, 6 Drawing Sheets

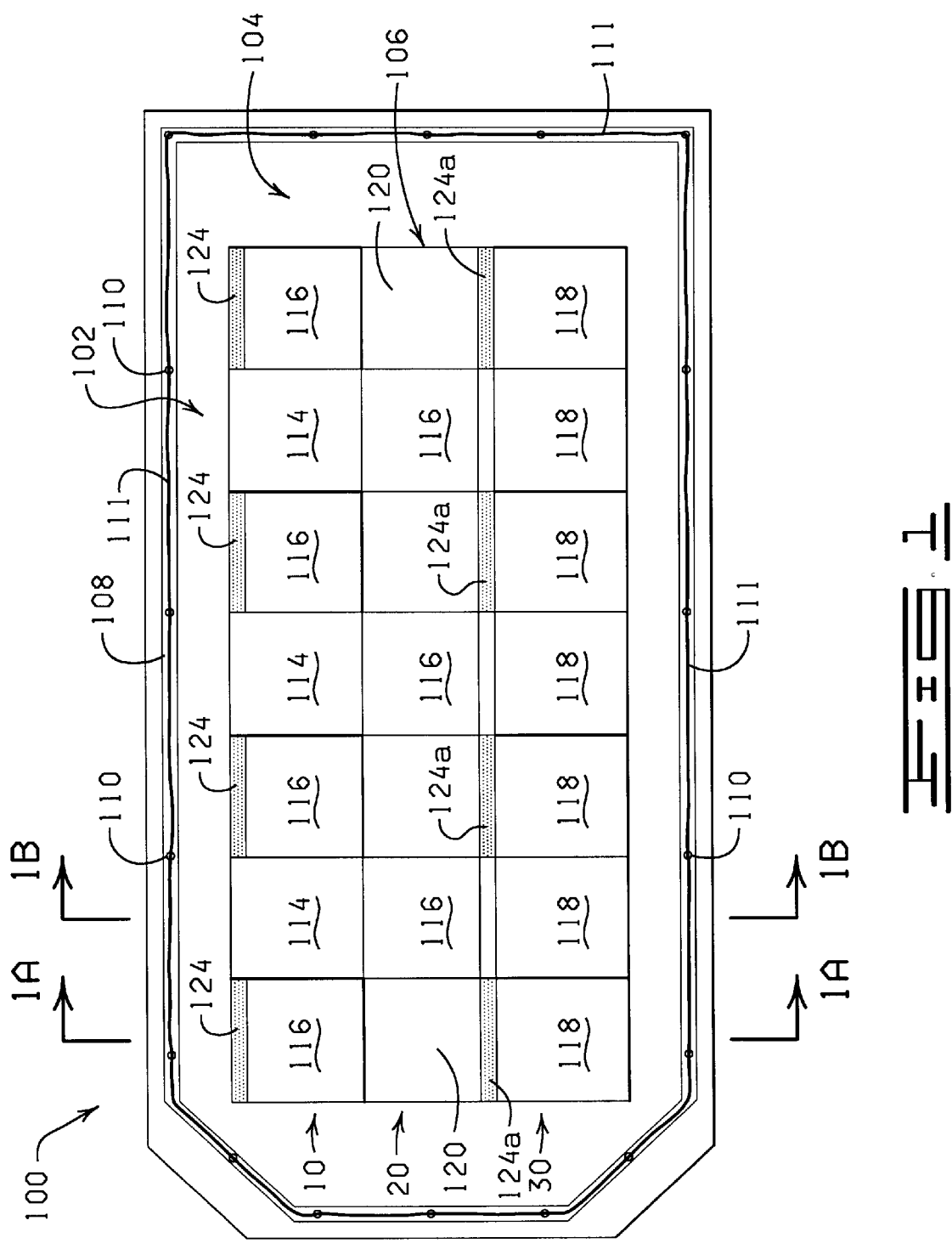

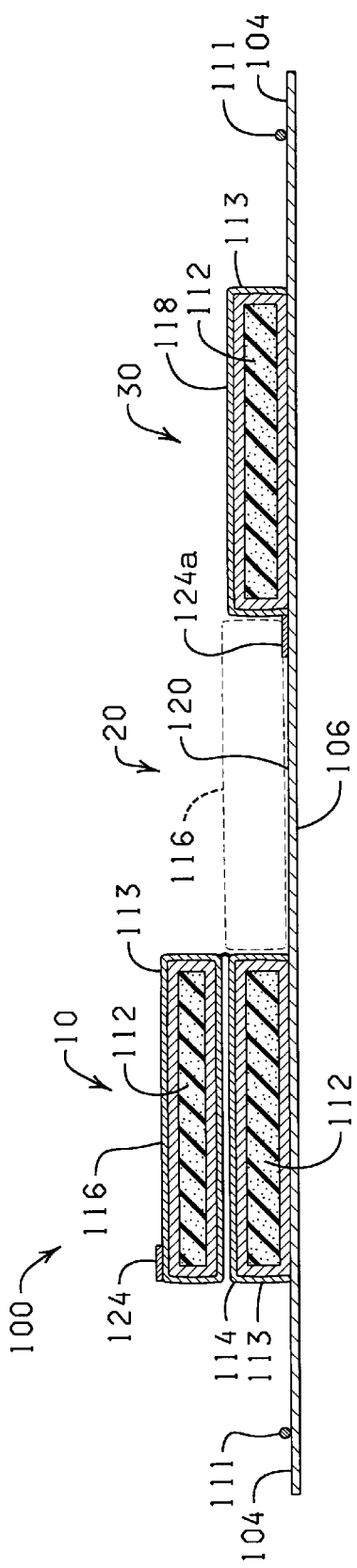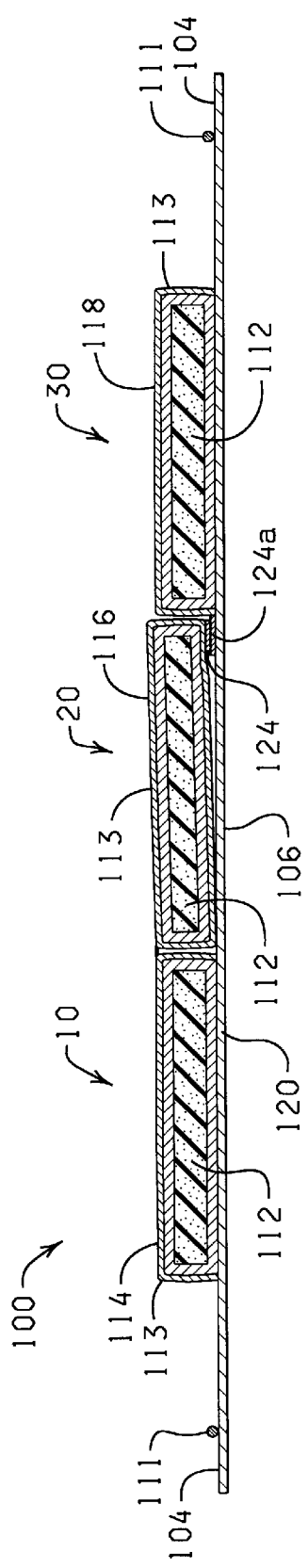

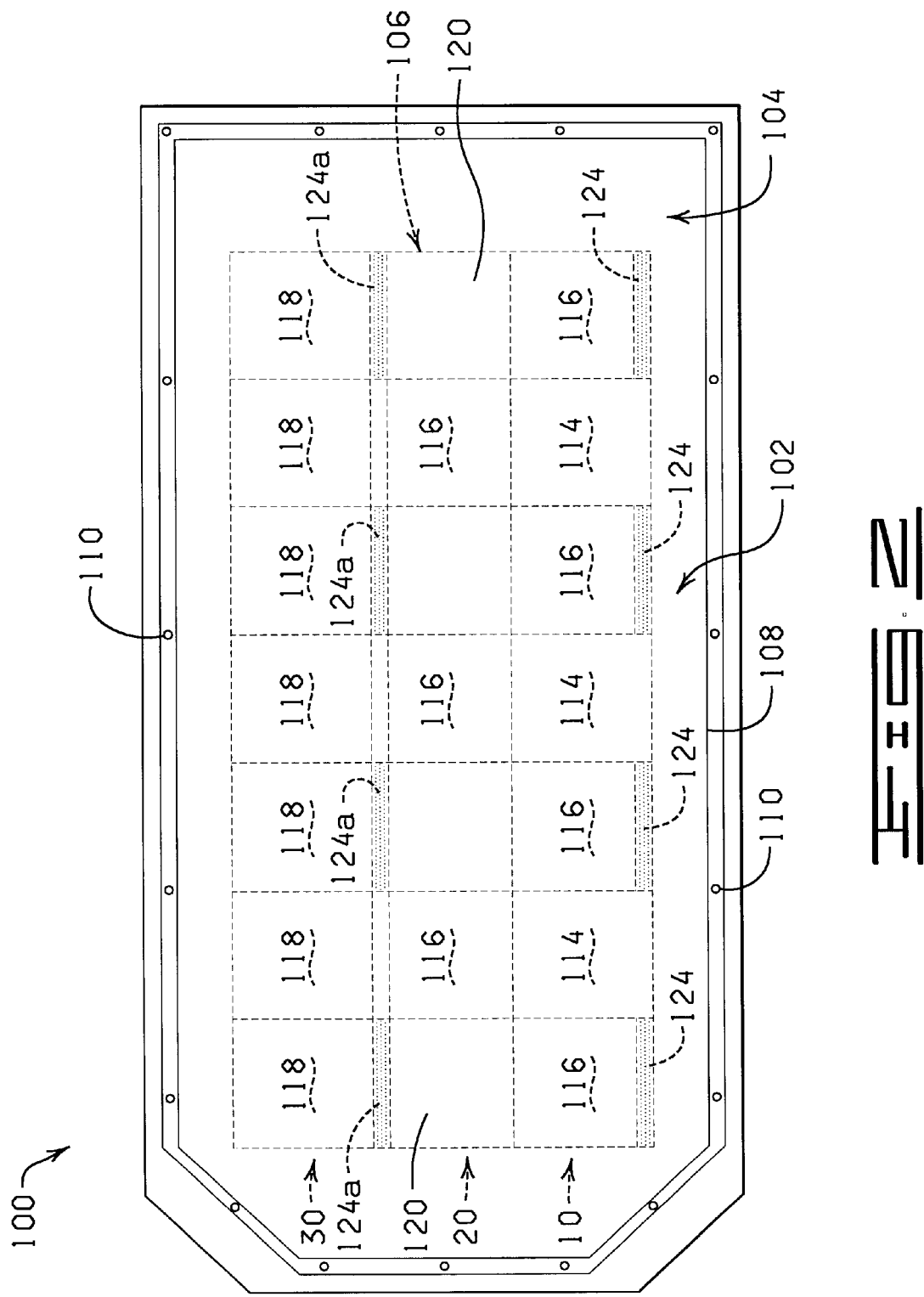

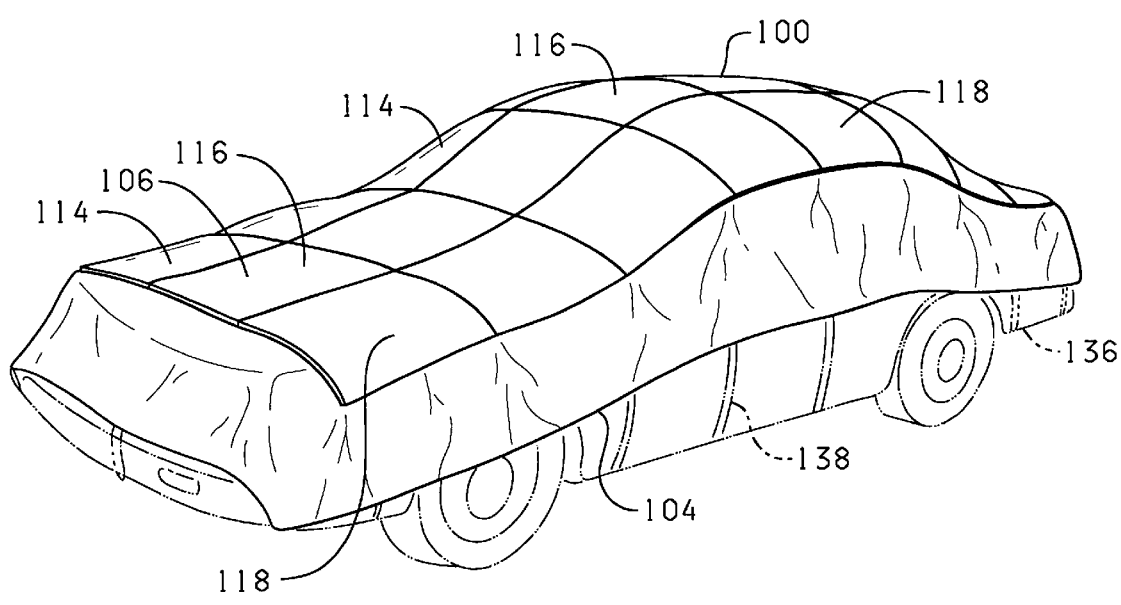

WEATHER BLANKET

RELATED APPLICATIONS

This application claims priority to U.S. Provisional Application No. 60/140,505 entitled WEATHER BLANKET, filed Jun. 22, 1999.

FIELD OF THE INVENTION

The present invention relates generally to a device for protecting a selected object or objects from the products of severe weather.

BACKGROUND OF THE INVENTION

Destructive and often unpredictable severe weather frequently destroys both real and personal property. For example, within seconds, hailstones can cause substantial damage to unprotected vehicles and equipment. On the opposite end of the weather gamut, continued exposure to solar radiation may cause extensive damage to the interiors and exteriors of unprotected automobiles. Often, such damage requires thousands of dollars in automotive repair.

Over the years, numerous attempts have been made to provide a convenient and effective means of protecting an automobile from weather's harmful effects. Prior inventions make use of inflatable cushions, stretched cloth, or rigid guards for protection from hailstones. Typically, the required inflation or complicated installation has made using these prior inventions cumbersome.

The great force with which hailstones strike an automobile demands that a protective cover withstand and repel such impact. A successful protective cover effectively dissipates the force generated by the impact of a hailstone. To be completely effective, a protective cover must guard a vehicle's windows and body panels. Additionally, it is desirable that the protective cover be portable, lightweight, and easily stored in the trunk of an automobile.

Accordingly, there is a need for an improved apparatus for protecting an automobile from harmful weather conditions.

SUMMARY OF THE INVENTION

The present invention provides an apparatus and associated method for protecting an object from the effects of inclement weather. In one aspect, the present invention provides an apparatus comprising a cover which has a central portion and a skirt portion. The central portion further comprises a plurality of pad members which are disposed about the central portion to allow an efficient and convenient method for folding the apparatus. Preferably, the skirt portion further comprises webbing and eyelets which are used to secure the apparatus to an object in the presence of inclement weather.

BRIEF DESCRIPTION OF THE DRAWINGS

FIG. 1 is a top plan view of an apparatus constructed in accordance with the preferred embodiment of the present invention.

FIG. 1A is a cross-sectional view taken through line 1A—1A of FIG. 1.

FIG. 1B is a cross-sectional view taken through line 1B—1B of FIG. 1.

FIG. 2 is a bottom plan view of the apparatus of FIG. 1.

FIG. 9 is a perspective view of the apparatus of FIG. 1 as deployed in an automotive application.

DETAILED DESCRIPTION OF THE PREFERRED EMBODIMENT

Figure 3:
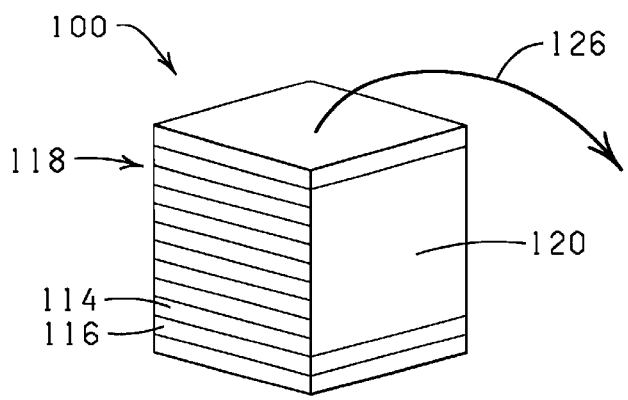
FIG. 3 is a perspective view of the apparatus of FIG. 1 in a folded position used during storage of the apparatus.

It will be understood that the following detailed description is directed to a preferred embodiment of the present invention designed to protect an automobile from the adverse effects of inclement weather. Additional embodiments are within the scope of the present detailed description. Such additional embodiments include, but are not limited to, apparatuses dimensionally scaled to provide personal protection from inclement weather.

Referring to FIGS. 1 and 2, respectively shown therein are a top plan view and a bottom plan view of an apparatus 100 for use in protecting an object, such as an automobile, from inclement weather. The apparatus 100 generally includes a cover 102 having a skirt portion 104 and a central portion 106. The skirt portion 104 preferably includes webbing 108 and eyelets 110. In the presently preferred embodiment, the skirt portion 104 is composed of a water resistant and flexible fabric. Heavy duty nylon cloth treated for water resistance, such as Oregon Oxford Cloth available from Astrup's of Irving, Tex., is an example of an acceptable fabric for construction of the skirt portion 104. The skirt portion 104 should preferably extend at least one foot in each direction around the entire perimeter of the central portion 106. As shown in FIG. 1, the skirt portion 104 may be fabricated such that one end is tapered at an angle to facilitate deployment of the apparatus 100 on an automobile. It will be understood that other applications for the present invention may demand alternative shapes and sizes for the skirt portion 104, all of which are within the scope of the present invention.

Continuing with the skirt portion 104, the webbing 108 is preferably a water resistant, high-tensile fabric which is sewn onto the skirt portion 104. In particularly preferred embodiments, the webbing 108 is constructed of two-inch nylon webbing and is sewn onto the skirt portion 104 with heavy gauge polyester thread. Any suitable stitching technique may be used to attach the various components within the apparatus 100. However, the stitch selected should strongly bind together the various components of the apparatus 100.

The eyelets 110 provide a means for securing a latching mechanism 111 (FIG. 1) to the skirt portion 104. The eyelets 110 are disposed within the webbing 108 and should be constructed of materials of sufficient strength to withstand prolonged exposure to inclement conditions. The eyelets 110 are preferably a plurality of metal rings that are of sufficient size to accommodate the selected latching mechanisms. It will be understood that additional designs for the eyelets 110 exist and are considered within the scope of the present invention. Such additional designs include, but are not limited to, loops of fabric sewn into the webbing 108.

The latching mechanism 111 is used to secure the apparatus 100 to the automobile. Such mechanisms include drawstrings, elastic bands, straps, rigid hooks and plastic clip devices. The latching mechanism 111 should be selected to enable secure and convenient placement of the apparatus 100 about an automobile.

Continuing with FIGS. 1, 1A, 1B and 2, the central portion 106 includes a plurality of a pad members disposed in at least three rows. The pad members are preferably constructed from a closed-cell foam material 112 which is encased within a fabric slip 113. Preferably, the closed-cell foam material 112 is primarily composed of polyethylene and the fabric slip 113 is fabricated from a water resistant fabric, such as the aforementioned Oregon Oxford Cloth. To permit efficient storage of the apparatus 100, the dimensions of every pad member should be uniform. The exact dimensions of the pad members may vary between selected embodiments of the present invention.

From FIG. 1, 1A and 1B, it can be seen that the central portion 106 is subdivided into a first row 10 having a plurality of first row pad members 114, a second row 20 having a plurality second row pad members 116 and a third row 30 having a plurality of third row pad members 118. Each row 10, 20 and 30 contains a plurality of adjacent pad members 114, 116 and 118 respectively which linearly extend across the length of the central portion 106. For the purposes of this disclosure, it will be understood that reference to pad members is generally descriptive and refers to all pad members 114, 116 and 118 contained within the apparatus 100.

The first row pad members 114 and third row pad members 118 are rigidly affixed to a base piece 120. Preferably, the base piece 120 is composed of the same Oregon Oxford Cloth suggested for construction of the skirt portion 104. The second row pad members 116 are pivotally attached to the base piece 120 to enable the folding of the second row pad members 116 from an unfolded position between the first and third row pad members 116, 118 to a position on top of the first row pad members 114. As shown in FIG. 1 and 1A each alternating second row pad member 116 is folded onto the top of the corresponding first row pad member 114 as indicated by the cross-sectional view provided in FIG. 1A.

While in the unfolded position, the second row pad members 116 are secured to the base piece 120 with fasteners 124 and 124a. Preferably, the fasteners 124 and 124a are "hook and loop" type fasteners which are matingly disposed on the second row pad members 116 and the base piece 120. Suitable heavy duty hook and loop fasteners are commercially available from Velcro USA Inc. of Manchester, N.H. It should be noted that additional fastener devices are contemplated as within the scope of the present invention and include interlocking mechanisms, zippers and magnetic couples.

Although the preferred embodiment of the present invention depicted in FIGS. 1, 1A, 1B and 2 contains three rows of pad members, it will be understood to one of ordinary skill in the art that additional rows of pad members are within the scope of the present disclosure. Similarly, the number of pad members per row depicted in FIGS. 1, 1A 1B and 2 is merely suggestive and not intended to limit the present disclosure.

Turning now to FIGS. 3–8, shown therein are instructional diagrams for a method of deploying (unfolding) the apparatus 100. It will be noted that, in the interests of facilitated instruction, the number of pad members 114, 116 and 118 depicted in FIGS. 3–8 is reduced from the number shown in FIGS. 1 and 2. Further, in the interests of clearly showing the storage and deployment of the apparatus 100, the skirt portion 104 and fasteners 124 and 124a have been removed from the portrayal of the apparatus 100 in FIGS. 3–8.

Starting with FIG. 3, shown therein is a perspective view of the apparatus 100 as folded in a "stacked" configuration. The top four pad members shown in FIG. 3 are third row pad members 118. The remaining eight pad members are alternating first and second row pad members 114, 116. Note that the base piece 120 is visible along one side of the stacked apparatus 100.

Figure 4:
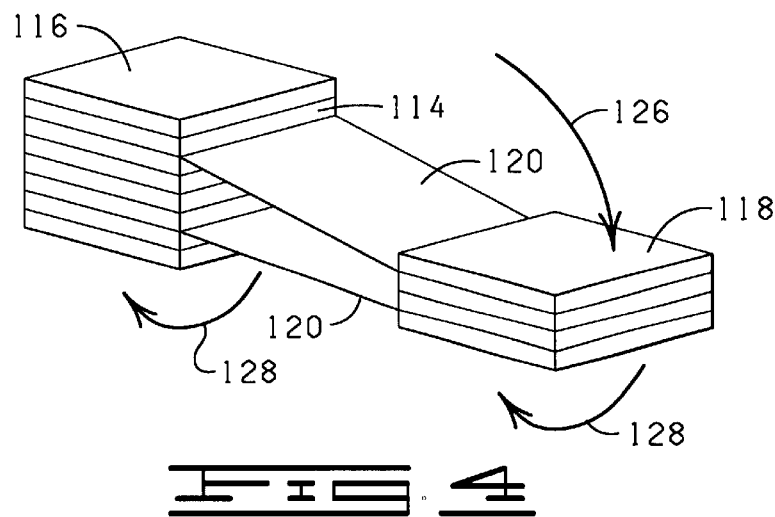
FIG. 4 is a perspective view of the apparatus of FIG. 1 in a first partially unfolded position.

The overall deployment operation consists essentially of three elementary steps: a preliminary unfolding, a primary unfolding and a secondary unfolding. First, the preliminary unfolding operation includes removing the third row pad members 118 from the top of the stacked apparatus 100 as depicted by arrows 126. The completed removal of the third row members 118 is shown in FIG. 4. The third row pad members 118 should be placed at a distance from the stacked first and second row pad members 114, 116 such that the base piece 120 is not extended beyond its ordinary length.

Figure 5:
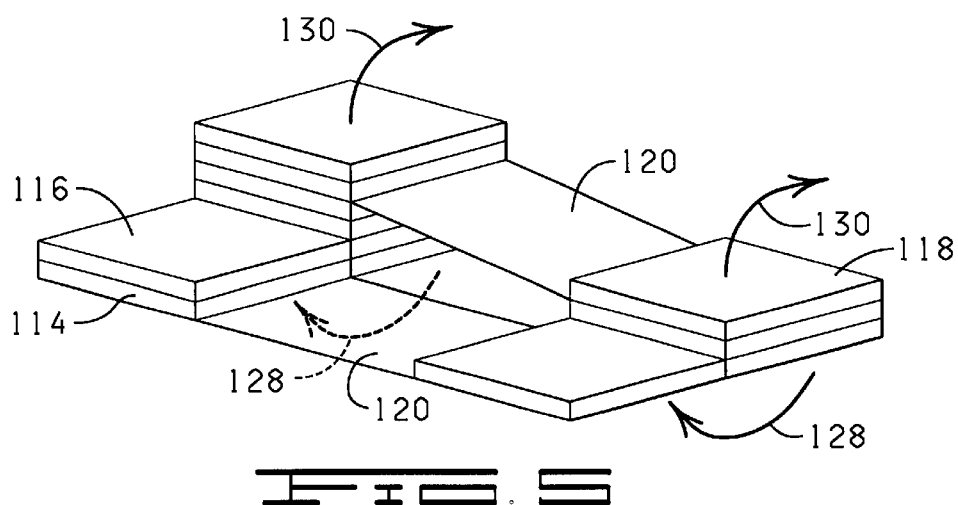
FIG. 5 is a perspective view of the apparatus of FIG. 1 in a second partially unfolded position.
Figure 6:
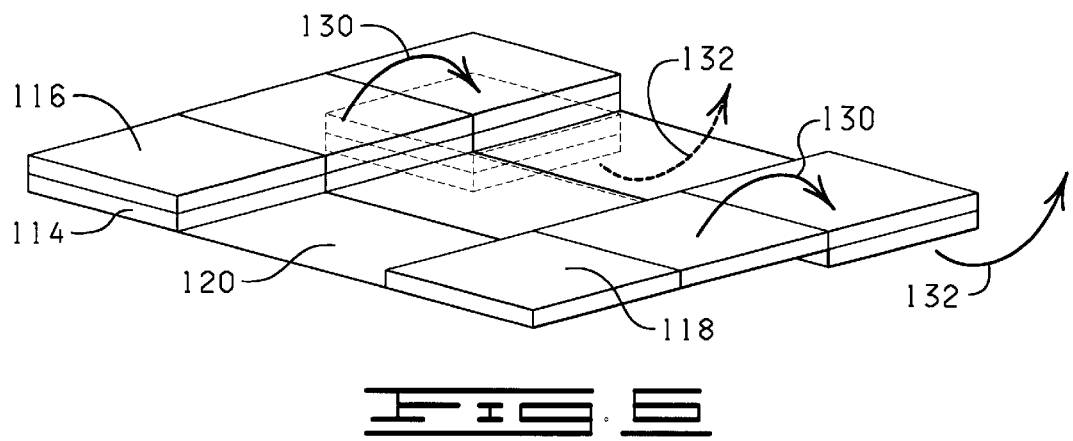
FIG. 6 is a perspective view of the apparatus of FIG. 1 in a third partially unfolded position.

Next, the primary unfolding operation begins by collectively unfolding the bottom first and second row pad members 114, 116 while simultaneously unfolding the bottom third row pad members 118 as shown by arrows 128. The completion of the unfolding shown by arrows 128 is depicted in FIG. 5. The primary unfolding operation is continued by collectively unfolding the first and second row pad members 114, 116 from the top of the remaining stack while simultaneously unfolding the third row pad member 118 as demonstrated by arrows 130. The completion of the unfolding operation illustrated by arrows 130 is shown in FIG. 6. The primary unfolding operation is completed by unfolding the remaining first and second row pad members 114, 116 from the bottom of the stack while simultaneously unfolding the third row pad member 118 as shown by arrows 132. The completion of the primary unfolding operation is shown in FIG. 7.

Figure 7:
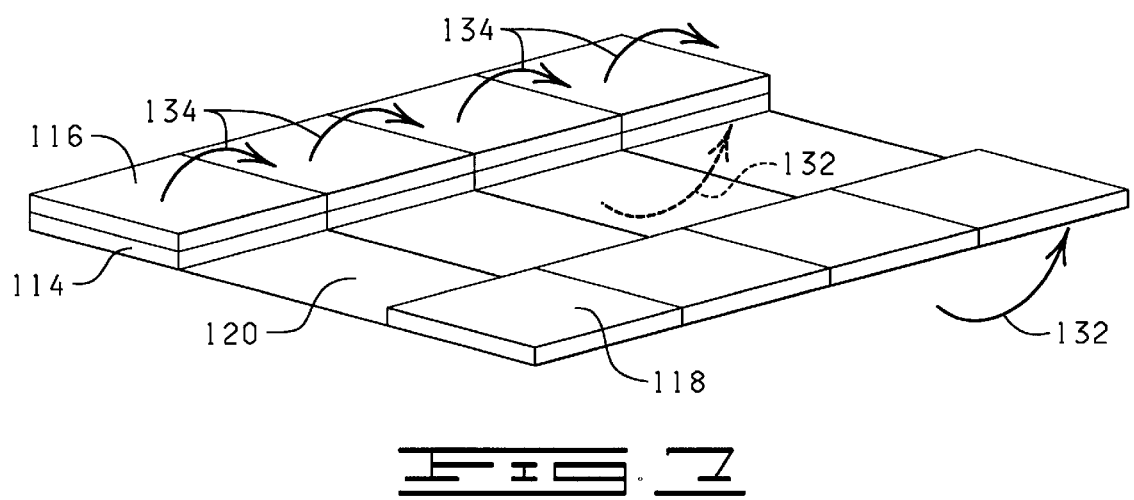
FIG. 7 is a perspective view of the apparatus of FIG. 1 in a fourth partially unfolded position.
Figure 8:
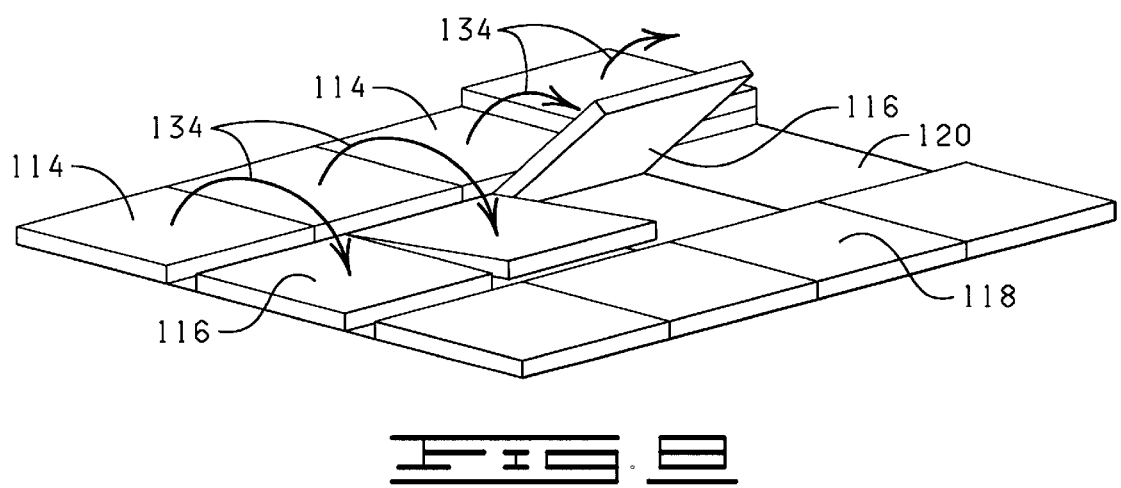
FIG. 8 is a perspective view of the apparatus of FIG. 1 illustrating the final unfolding operation.

FIGS. 7 and 8 show the secondary unfolding operation whereby the second row pad members 116 are unfolded from their position on top of the first row pad members 114, as indicated by arrows 134. Once unfolded, the secondary unfolding operation is completed by securing the second row pad members 116 to the base piece 120 through use of the fasteners 124 and 124a (not shown in FIGS. 7 and 8). The apparatus 100 is returned to its "stacked" configuration by reversing the above described deployment steps.

It will be understood that additional methods for deploying the apparatus 100 are encompassed within the scope of the present disclosure. Such additional methods include, but are not limited to, re-ordering the method steps illustrated by FIGS. 4–7.

Turning now to FIG. 9, shown therein is a perspective view of the apparatus 100 deployed on a common automobile 136. As seen from FIG. 9, the central portion 106 and associated pad members 114, 116 and 118 are positioned over those portions of the car which are most susceptible to damage from hailstones. The skirt portion 104 covers a portion of the windows, fenders, quarter-panels, front bumper and rear bumper (not numerically designated). As shown in FIG. 9, the latching mechanism includes a plurality of straps 138 which connect the eyelets not shown to various portions of the automobile 136.

It will be clear that the present invention is well adapted to attain the ends and advantages mentioned in this disclosure as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

It is claimed:

1. A blanket for protecting an object from inclement weather, comprising:

a cover comprising a central portion and a skirt portion;

a plurality of pad members disposed about the central portion, wherein the plurality of pad members are adjacently arranged in at least three rows of pad members, wherein the rows comprise a first row of pad members, a second row of pad members and a third row of pad members, wherein the second row of pad members has a proximal side adjacent the first row of pad members and a distal side adjacent the third row of pad members, wherein the first and third rows of pad members are secured to a base piece of the central portion, and wherein the second row of pad members is pivotally attached to the base piece of the central portion at the proximal side of the second row of pad members such that the second row of pad members can be folded onto the first row of pad members; and a fastener which engages the distal side of the second row of pad members when the second row of pad members is extended to occupy an unfolded position between the first row of pad members and the third row of pad members.

2. The blanket of claim 1 wherein the cover is of a sufficient size to substantially cover those portions of an automobile that are directly exposed to the products of inclement weather.

3. The blanket of claim 1 wherein the cover comprises a flexible and water resistant fabric.

4. The blanket of claim 1 wherein the cover further comprises webbing disposed about the periphery of the skirt portion.

5. The blanket of claim 4, wherein the cover further comprises a latching mechanism.

6. The blanket of claim 5, wherein the latching mechanism comprises a drawstring.

7. The blanket of claim 6, wherein the drawstring is enclosed within the skirt portion.

8. The blanket of claim 5, wherein the latching mechanism comprises an elastic band or strap.

9. The blanket of claim 1 wherein each of the plurality of pad members comprise a closed-cell foam material.

10. The blanket of claim 9, wherein each of the plurality of pad members is enclosed within a fabric slip.

11. The blanket of claim 10, wherein the fabric slip comprises a flexible, water resistant fabric.

12. A blanket for protecting an object from inclement weather, comprising:

a base piece comprising a plurality of pad members which are adjacently arranged in at least three rows of pad members, wherein the rows comprise a first row of pad members, a second row of pad members and a third row of pad members, wherein the second row of pad members has a proximal side adjacent the first row of pad members and a distal side adjacent the third row of pad members, wherein the first and third rows of pad members are rigidly affixed to the base piece, and wherein the second row of pad members is pivotally attached to the base piece near the proximal side of the second row of pad members such that the pad members of the second row of pad members can be folded onto the pad members of the first row of pad members; and a fastener which engages the distal side of the second row of pad members when the second row of pad members is extended to occupy an unfolded position between the first row of pad members and the third row of pad members.

* * * * *